United States Patent
Liu et al.

(10) Patent No.: US 11,218,680 B2
(45) Date of Patent: Jan. 4, 2022

(54) GENERATION OF THREE-DIMENSIONAL IMAGES WITH DIGITAL MAGNIFICATION

(71) Applicant: Unify Medical, Westlake, OH (US)

(72) Inventors: Yang Liu, Westlake, OH (US); Maziyar Askari Karchegani, Coralville, IA (US)

(73) Assignee: Unify Medical, Inc., Cleveland, OH (US)

(*) Notice: Subject to any disclaimer, the term of this patent is extended or adjusted under 35 U.S.C. 154(b) by 0 days.

(21) Appl. No.: 17/331,579

(22) Filed: May 26, 2021

(65) Prior Publication Data
US 2021/0377505 A1 Dec. 2, 2021

Related U.S. Application Data

(60) Provisional application No. 63/029,831, filed on May 26, 2020.

(51) Int. Cl.
| | |
|---|---|
| *H04N 13/00* | (2018.01) |
| *H04N 13/106* | (2018.01) |
| *H04N 13/239* | (2018.01) |
| *G06T 3/40* | (2006.01) |
| *H04N 5/225* | (2006.01) |

(52) U.S. Cl.
CPC ............ *H04N 13/106* (2018.05); *G06T 3/40* (2013.01); *H04N 5/22525* (2018.08); *H04N 13/239* (2018.05); *G06T 2210/22* (2013.01)

(58) Field of Classification Search
CPC ............ H04N 5/00; H04N 13/00; G06T 3/00
See application file for complete search history.

(56) References Cited

U.S. PATENT DOCUMENTS

| | | | |
|---|---|---|---|
| 8,508,580 B2 | 8/2013 | McNamer et al. | |
| 2009/0116732 A1* | 5/2009 | Zhou | H04N 13/261 382/154 |

(Continued)

FOREIGN PATENT DOCUMENTS

WO 2015100490 A1 7/2015

OTHER PUBLICATIONS

International Search Report; International Searching Authority; International Patent Application No. PCT/US2021/034366; dated Sep. 9, 2021; 2 pages.

(Continued)

*Primary Examiner* — Maryam A Nasri
(74) *Attorney, Agent, or Firm* — Taft Stettinius & Hollister LLP

(57) ABSTRACT

A system for generating three-dimensional (3D) images from captured images of a target when executing digital magnification. A controller executes a digital magnification on the first image of the target captured by the first image sensor and on the second image captured by the second image sensor of the target. The controller crops the first image and the second image to overlap a first portion of the target captured by the first image sensor with a second portion of the target captured by the second image sensor. The controller adjusts the cropping of the first image and the second image to provide binocular overlap of the first portion of the target with the second portion of target. The displayed cropped first image and the cropped second image display the 3D image at the digital magnification to the user.

20 Claims, 10 Drawing Sheets

(56) References Cited

U.S. PATENT DOCUMENTS

2011/0102549 A1    5/2011   Takahashi
2016/0191794 A1*   6/2016   Varonos ............... H04N 5/2253
                                                          348/36
2020/0344459 A1*  10/2020   Honkanen ............ H04N 13/236

OTHER PUBLICATIONS

Written Opinion; International Searching Authority; International Patent Application No. PCT/US2021/034366; dated Sep. 9, 2021; 6 pages.

* cited by examiner

GENERATION OF THREE-DIMENSIONAL IMAGES WITH DIGITAL MAGNIFICATION

CROSS-REFERENCE TO RELATED APPLICATIONS

This application is a U.S. Nonprovisional Application which claims the benefit of U.S. Provisional Application No. 63/029,831 filed on May 26, 2020, which is incorporated herein by reference in its entirety.

BACKGROUND

Field of Disclosure

The present disclosure relates to the generation of the Three-Dimensional (3D) images and specifically to the generation of 3D images from the digital magnification of images captured of a target.

Related Art

Conventionally, surgical loupes have been used extensively in various types of surgeries. Surgical loupes are a pair of optical magnifiers that magnify the surgical field and provide magnified stereoscopic vision. However, conventional surgical loupes have significant limitations. For example, a single set of conventional surgical loupes only offer a fixed level of magnification, such as 2× without any capabilities to vary such magnification. Therefore, surgeons typically require several pairs of surgical loupes with each pair having a different level of magnification to cater for different levels of magnifications. Changing surgical loupes in the operating room is inconvenient with an increased cost to have several sets of surgical loupes with different magnifications customized for a single one surgeon.

However, equipping conventional surgical loupes with magnifying lenses typically include an increased length resulting in an increased form factor and increased weight and thereby limit the magnification level. The increased form factor and increased weight also limit the duration of surgical procedures that the surgeon may execute. Further, conventional surgical loupes implement a non-imaging configuration, whereby the magnification lenses magnify and form a pair of virtual images thereby decreasing the working distances and depths of focus for the surgeon. Therefore, the surgeon has to restrict the position of their head and neck to a specific position as they use the conventional surgical loupes. This results in neck pains and cervical diseases for surgeons with long term use of conventional surgical loupes.

Rather than simply having surgical loupes use non-imaging configurations, conventional imaging configurations in the non-surgical space include stereo imaging systems and imaging systems with zoom lenses where such conventional imaging configurations generate 3D images while enabling the adjustment of magnification. However, the incorporation of such conventional imaging configurations in the surgical space require the implementation of two displays and/or zoom lenses for the surgeon. The two stereo displays included in such conventional stereo imaging systems must be mechanically adjusted for each magnification level as well as calibrated. Such mechanical adjustment and calibration in the surgical space is not feasible. The changing in magnification for two conventional zoom lenses requires each image at each magnification level to always be captured at the center of the initial image where each level of magnification continues to capture the center of the initial image. The resulting 3D image displayed to the surgeon is significantly skewed thereby preventing the incorporation of conventional zoom lenses into the surgical space.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 7:
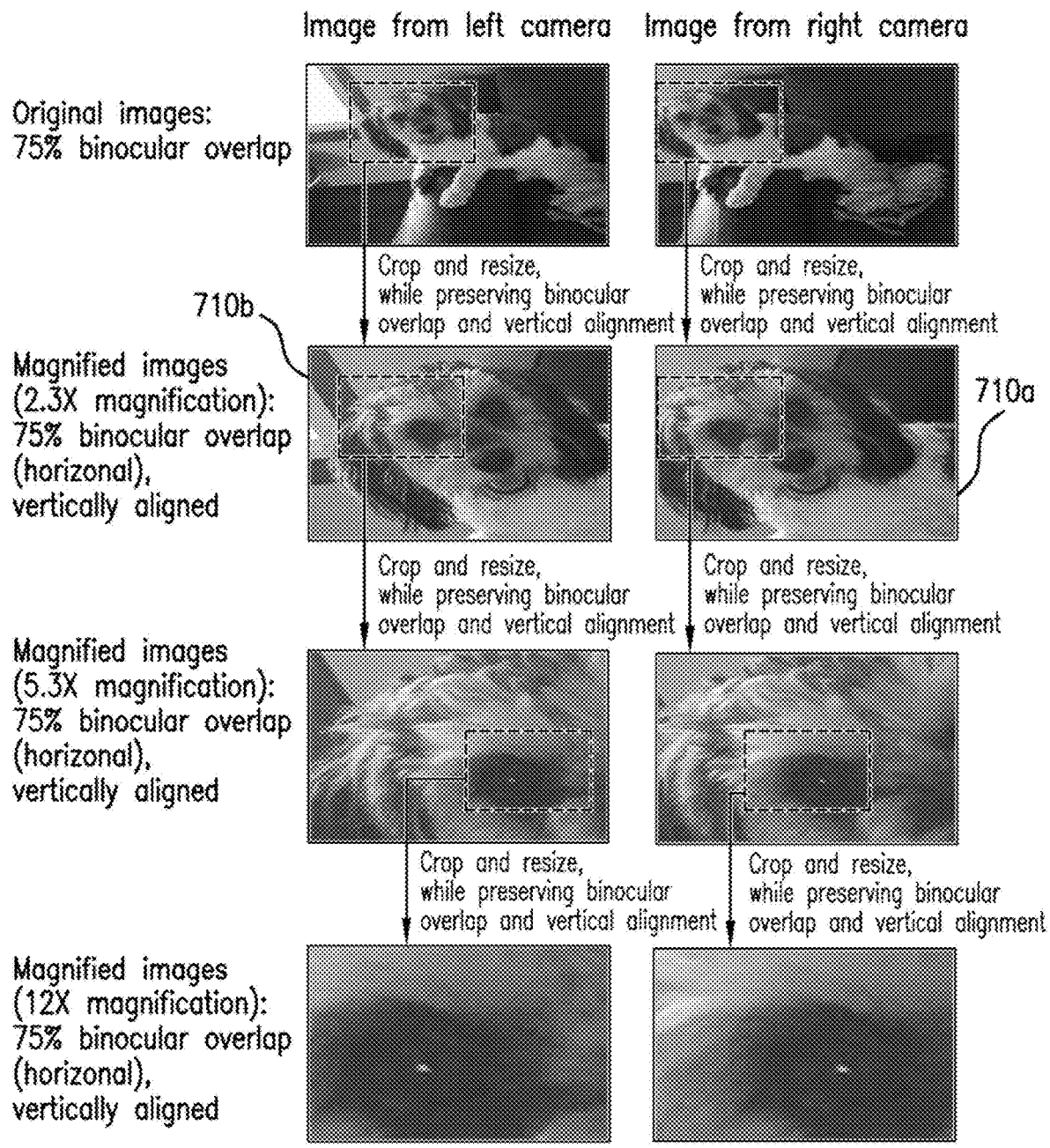
Figure 8:
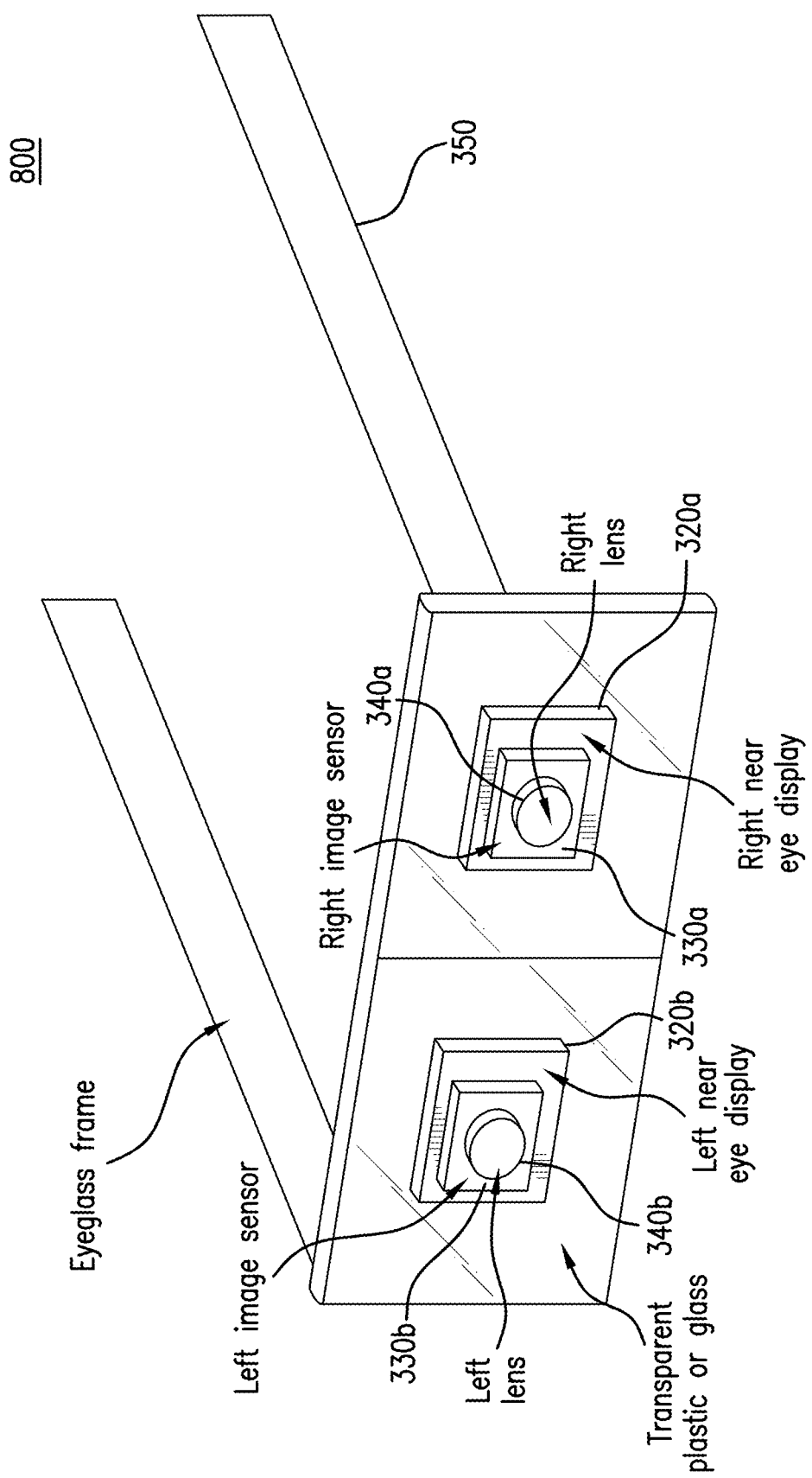

FIG. 7 depicts a schematic view of a preservation of binocular overlap and binocular vertical alignment configuration where at 2.3×, 5.3C, and 12×, respectively, the left cropped images and the right cropped images have binocular overlap of 75% and vertical alignment thereby resulting in an increased 3D visualization experience and depth perception may be provided to the user; and FIG. 8 depicts a schematic view a physical embodiment of a digital magnification surgical loupe configuration.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

SYSTEM OVERVIEW

Figure 1A:
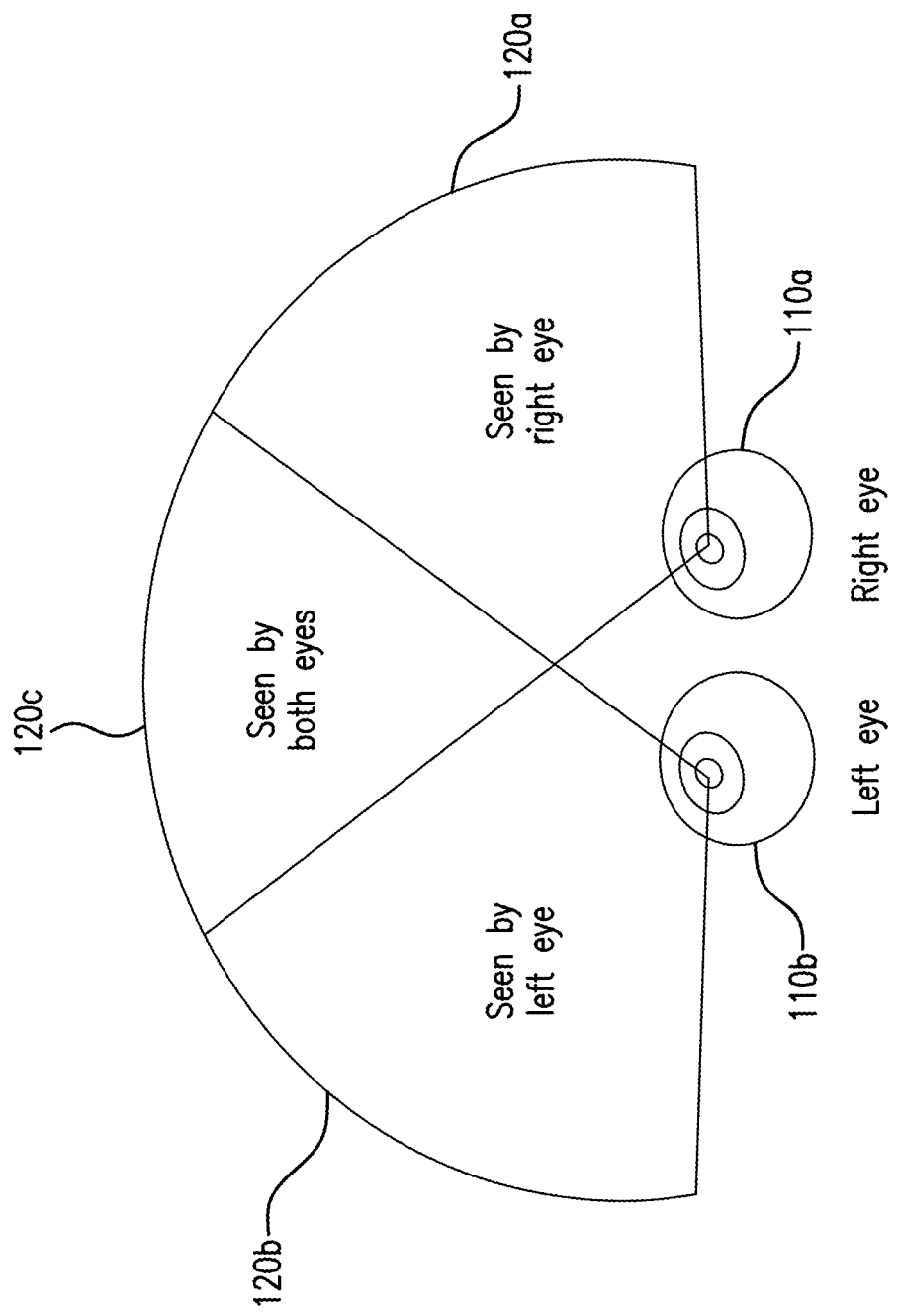
FIG. 1A illustrates a schematic view of binocular overlap of human eyes configuration where the region seen by both eyes is the overlapped region included in the scene seen by both eyes.

FIG. 1A illustrates a schematic view of binocular overlap of human eyes configuration 100 where the region seen by both eyes is the overlapped region included in the scene seen by both eyes. The binocular overlap of human eyes configuration 100 includes a right eye 110a, a left eye 110b, an image as seen by right eye 120a, an image as seen by left eye 120b, and a binocular overlap 120c as seen by both eyes.

The present invention describes the apparatus, systems, and methods for constructing augmented reality devices for medical and dental magnification. One of the key concepts in 3D imaging and visualization is binocular overlap 120c. Binocular overlap 120c describes the overlap between the image as seen by the left eye 120b, versus the image as seen by the right eye 120a. For human being, a binocular overlap 120c is approximately 70%.

Figure 1B:
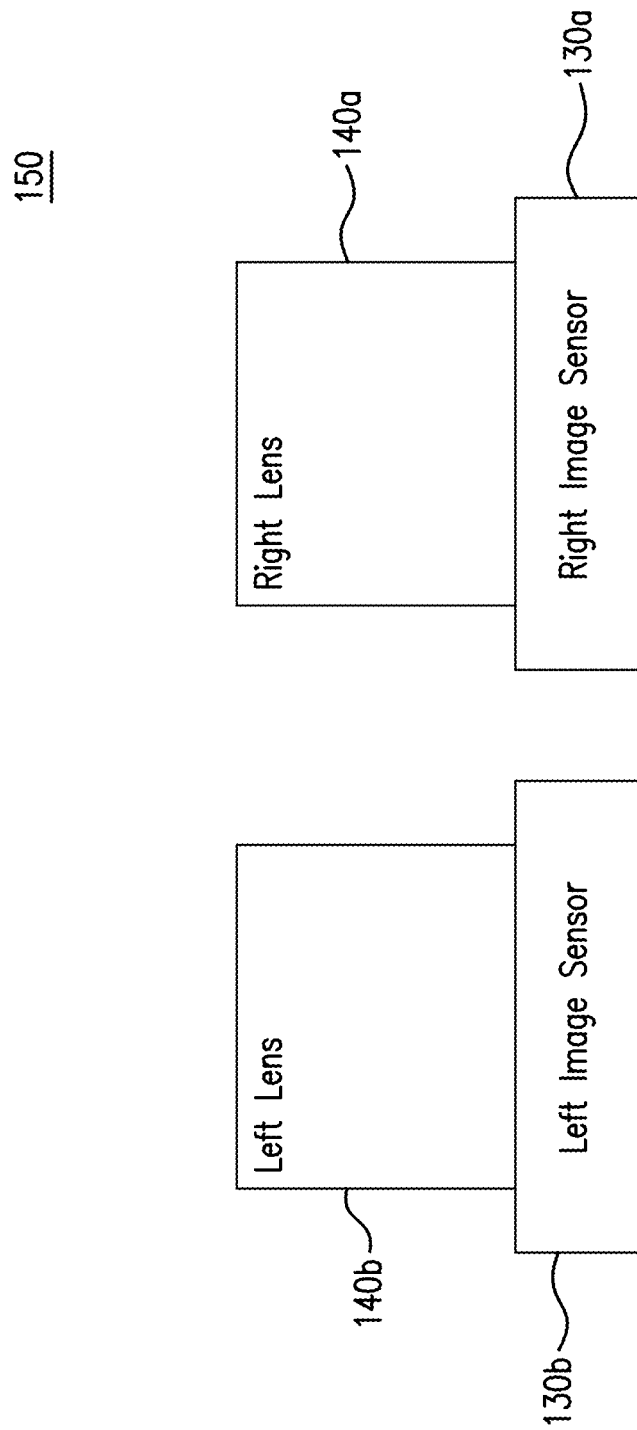
FIG. 1B illustrates a block diagram of a two imaging sensor configuration where two image sensors with two lenses are used in a side-by-side configuration.
Figure 1C:
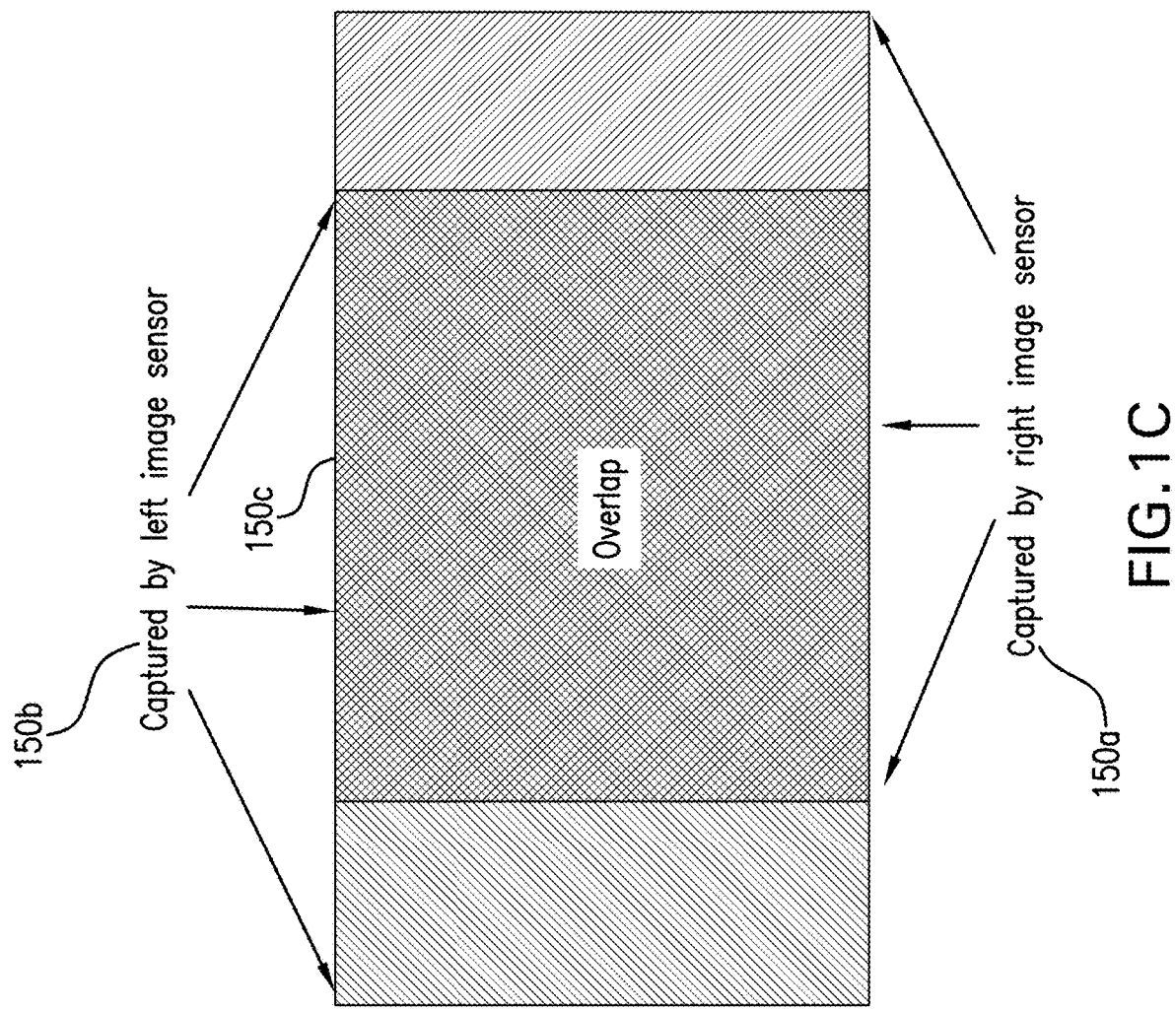
FIG. 1C illustrates a block diagram a binocular overlap of two imaging sensor configuration with the regions seen by both imaging sensors is the overlapped region.

FIG. 1B illustrates a block diagram of a two imaging sensor configuration 150 where two image sensors with two lenses are used in a side-by-side configuration. The two imaging sensor configuration 150 includes a right image sensor 130a, a left image sensor 130b, a right lens 140a, and a left lens 140b. FIG. 1C illustrates a block diagram a binocular overlap of two imaging sensor configuration 175 with the regions seen by both imaging sensors is the overlapped region. The binocular overlap of two imaging sensor configuration 175 includes a captured region by right image sensor 150a, a captured region by left image sensor 150b, and a binocular overlap region 150c. FIG. 1C depicts the binocular overlap region 150c that is generated when a right image sensor 130a and a left image sensor 130b are used in a side-by-side configuration as depicted in FIG. 1B.

Figure 2:
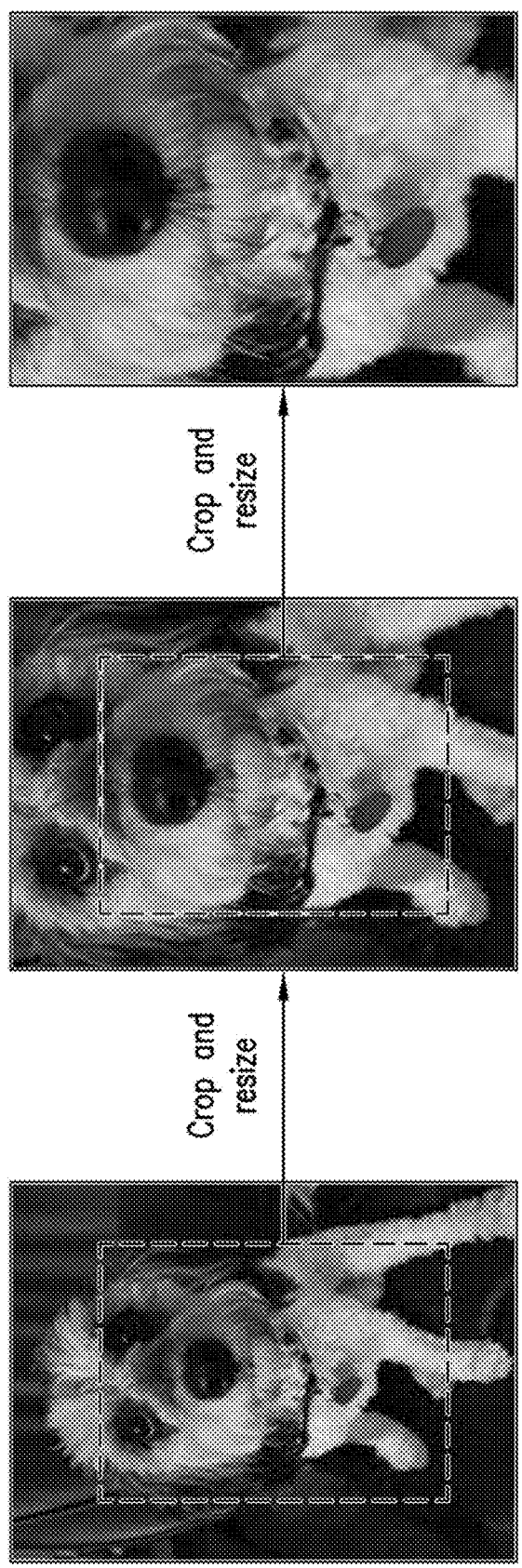
FIG. 2 depicts a schematic view of a conventional digital zoom configuration where the original image is cropped and resized (from left to right)

FIG. 2 depicts a schematic view of a conventional digital zoom configuration 200 where the original image is cropped and resized (from left to right). The cropped and resized images are displayed to the user after conventional digital zooming. Conventionally, digital zoom has been commonly used to zoom the image. The principle of conventional digital zoom is illustrated in FIG. 2. Although conventional digital zoom can magnify the images without the need of zoom lenses, it is not suitable for 3D magnification.

Figure 3:
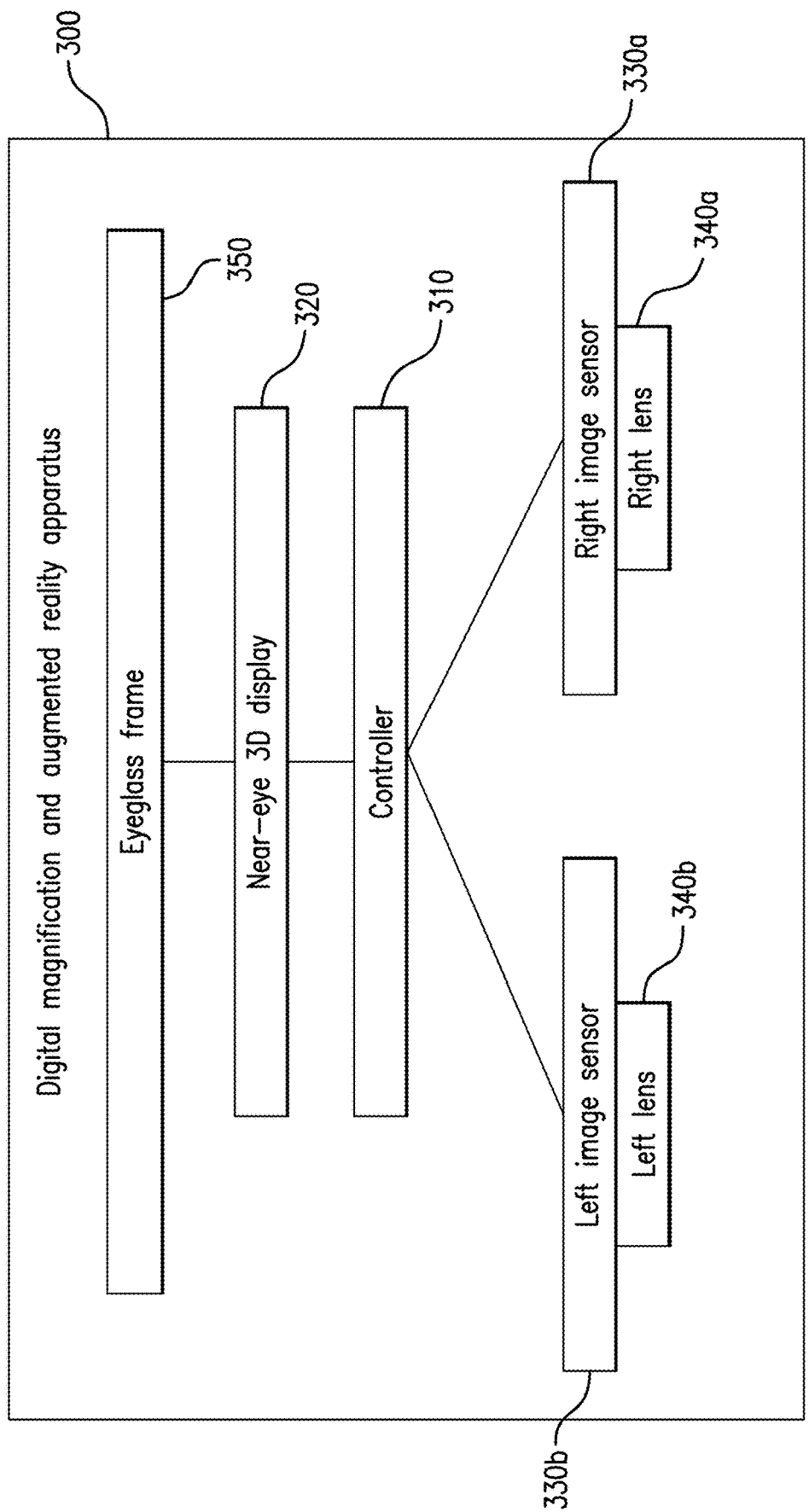
FIG. 3 illustrates a block diagram of a digital magnification of a 3D image system that may generate 3D images when executing digital magnification on captured images of a target.

FIG. 3 illustrates a block diagram of a digital magnification of a 3D image system 300 that may generate 3D images when executing digital magnification on captured images of a target. The digital magnification of a 3D image system 300 includes a right lens 340a, a left lens 340b, a right image sensor 330a, a left image sensor 330b, a controller 310, a near-eye 3D display 320, and an eyeglass frame 350. In one embodiment, the eyeglass frame 350 is a head mount. In another embodiment, the eyeglass frame 350 is a traditional eyeglass frame sitting on the nose and ears of a user.

The digital magnification of a 3D image system 300 may generate 3D images from captured images of a target when executing digital magnification on the captured images to maintain the 3D images generated of the target after digital magnification. A first image sensor (such as right image sensor 330a) may capture a first image at an original size of the target. A second image sensor (such as left image sensor 330b) may be positioned on a common x-axis with the first image sensor 330a to capture a second image at the original size of the target. It should be appreciated that the first image sensor 330a and the second image sensor 330b may be positioned with either a converging angle or a diverging angle.

A controller 310 may execute a digital magnification on the first image captured by the first image sensor 330a at the original size of the target and on the second image captured by the second image sensor 330b at the original size of the target. The controller 310 may crop the first image captured by the first image sensor 330a and the second image captured by the second image sensor 330b to overlap a first portion of the target captured by the first image sensor 330a with a second portion of the target captured by the second image sensor 330b. The first portion of the target captured by the first image sensor 330a overlaps with the second portion of the target captured by the second image sensor 330b. In one aspect, the first image sensor 330a is further coupled with a first autofocus lens and the second image sensor 330b is further coupled with a second autofocus lens. The autofocus lenses may enable autofocus.

The controller 310 may adjust the cropping of the first image and the second image to provide binocular overlap of the first portion of the target with the second portion of the target. The binocular overlap of the first image and the second image is an overlap threshold that when satisfied results in a 3D image of the target displayed to a user after the digital magnification is executed. The controller may instruct a display (such as near-eye 3D display 320) to display the cropped first image and the cropped second image that includes the binocular overlap to the user. The displayed cropped first image and the cropped second image display the 3D image at the digital magnification to the user.

The controller 310 may resize the cropped first image to the original size of the first image captured by the first image sensor 330a and the cropped second image to the original size of the second image captured by the second image sensor 330b. The cropped first image as resized and the cropped second image resized includes the binocular overlap of the first image and the second image. The controller 310 may instruct the near-eye 3D display 320 to display the resized and cropped first image and the resized and cropped second image that includes the binocular overlap to the user. The displayed resized and cropped first image and the resized and cropped second image display the 3D image at the digital magnification to the user. It should be appreciated that in one embodiment the controller 310 may crop the first image captured by the first image sensor 330a, to generate both left cropped image and right cropped image. In this embodiment, the second image captured by the second image sensor 330b is not used.

In one aspect, the display 320 is a near-eye display. In one embodiment, the display 320 is a 2D display. In another embodiment, the display 320 is a 3D display. It should be further appreciated that the near-eye display 320 may comprise LCD (liquid crystal) microdisplays, LED (light emitting diode) microdisplays, organic LED (OLED) microdisplays, liquid crystal on silicon (LCOS) microdisplays, retinal scanning displays, virtual retinal displays, optical see-through displays, video see-through displays, convertible video-optical see-through displays, wearable projection displays, projection display, and the like. It should be the appreciated that the display 320 may be stereoscopic to enable displaying of 3D content. In another embodiment, the display 320 is a projection display. It should be appreciated that the display 320 may be a monitor placed near the user.

It should be further appreciated that the display 320 may be a 3D monitor placed near the user and the user will wear a polarizing glass or active shutter glasses. It should be further appreciated that the display 320 may be a half transparent mirror placed near the user to reflect the image projected by a projector. It should be further be appreciated that the said projector may be 2D or 3D. It should be further appreciated that the said projector may be used with the user wearing a polarizing glass or active shutter glasses. In one embodiment, the display 320 is a flat panel 2D monitor or TV. In another embodiment, the display 320 is a flat panel 3D monitor or 3D TV. The 3D monitor/TV may need to work with passive polarizers or active shutter glasses. In one aspect, the 3D monitor/TV is glass-free. It should be appreciated that the display 320 can be a touchscreen, or a projector. In one example, the display 320 comprises a half transparent mirror that can reflect projection of images to the eyes of the user. The images being projected may be 3D, and the user may wear 3D glasses (e.g. polarizer; active shutter 3D glasses) to visualize the 3D image data reflected by the half transparent mirror. The half transparent mirror may be placed on top of the surgical field to allow the user to see through the half transparent mirror to visualize the surgical field.

It should be appreciated that the binocular of the system may be set as high as 100% or as low as 0%, depending on the specific application. In one aspect, the binocular overlap is set to be within the range of 60% and 100%. In another aspect, the binocular overlap is dynamic and not static.

In one aspect, the digital magnification of a 3D image system 300 may further comprise additional sensors or components. In one embodiment, the system 300 further comprise a microphone, which may enable audio recording and/or communication. In one embodiment, the system 300 further comprise a proximity sensor, which may sense if user is wearing the system. In another embodiment, the system 300 further comprise a inertial measurement unit (IMU), an accelerometers, a gyroscopes, a magnetometers, or a combination thereof. In one embodiment, the system 300 further comprise a loudspeaker or earphone, which may enable audio replay or communication.

It should be further appreciated that the system can be applied a variety of applications, including but not limited to surgical, medical, veterinary, military, tactical, educational, industrial, consumer, jewelry fields.

DIGITAL MAGNIFICATION WITH BINOCULAR VERTICAL ALIGNMENT

Figure 4:
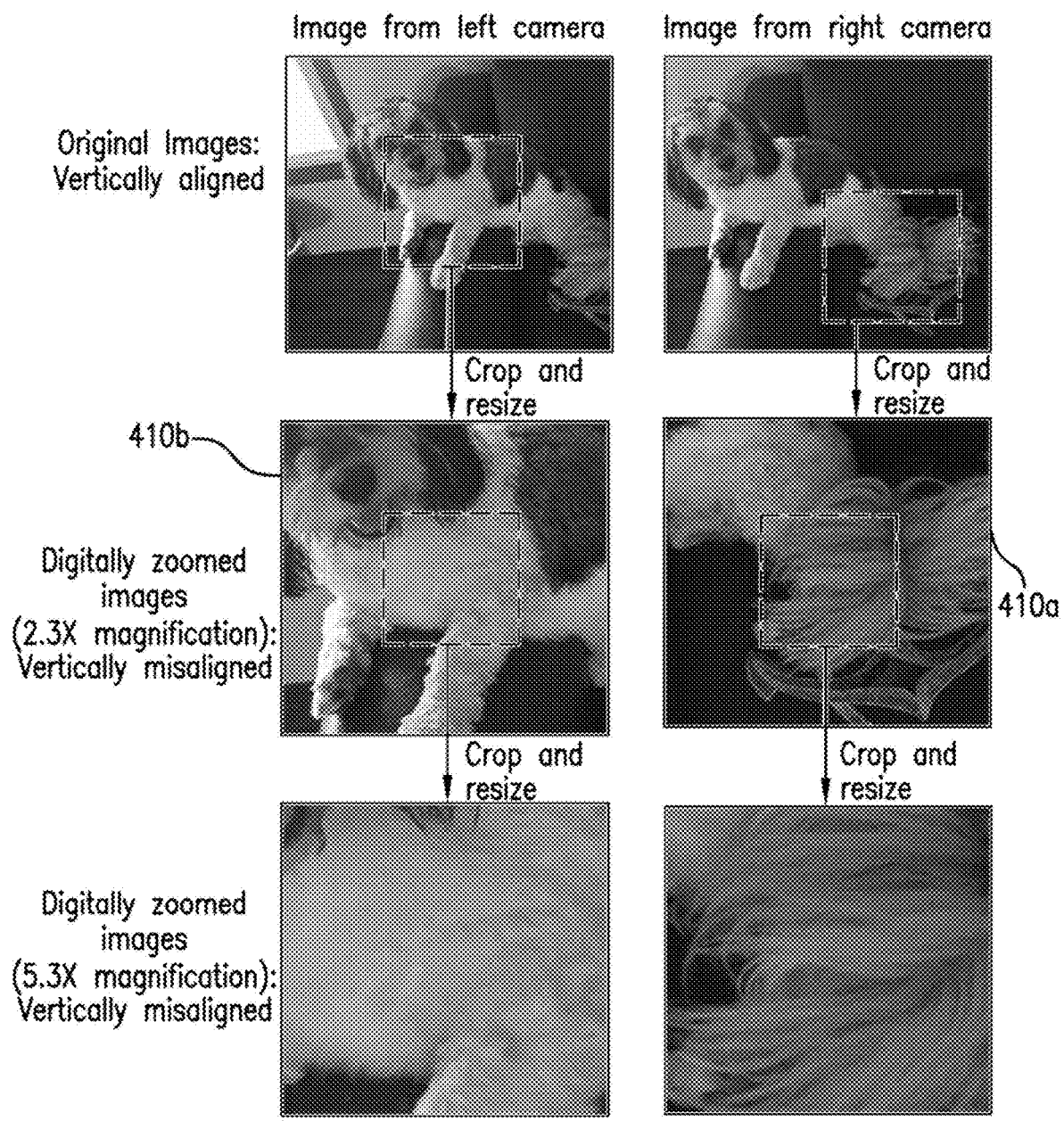
FIG. 4 depicts a schematic view of a conventional digital zoom configuration where the zoomed left images and zoomed right images are misaligned leading to poor 3D vision and depth perception.

FIG. 4 depicts a schematic view of a conventional digital zoom configuration 400 where the zoomed left images and zoomed right images are misaligned leading to poor 3D vision and depth perception. The conventional digital zoom configuration 400 includes the zoomed right images 410a that are misaligned with the zoomed left images 410b. Conventional digital zoom does not work well on magnifying of stereo-images for 3D display. FIG. 3 shows an example of direct application of conventional digital zoom to stereo-images. Conventional digital zoom is not suitable for magnifying 3D stereo-images, as it introduces binocular vertical misalignment.

The controller 310 may crop the first image captured by the first image sensor 330a and the second image captured by the second image sensor 330b to vertically align the overlap of the first portion of the target with the second portion of the target. The cropped first image is in vertical alignment of the cropped second image when each vertical coordinate of the cropped first image is aligned with each corresponding vertical coordinate of the cropped second image. The controller 310 may adjust the cropping of the first image and the second image to provide binocular overlap of the first portion of the target with the second portion of the target. The binocular overlap of the first image and the second image is vertically aligned to satisfy the overlap threshold to generate the 3D image of the target displayed to the user after the digital magnification is executed.

The present invention discloses a digital magnification method that also ensures binocular vertical alignment. In one embodiment, the left image is captured by the left image sensor 330b and cropped by the controller 310, and the right image is captured by the right image sensor 330a and cropped by the controller 310, while the cropping of left and right images preserves vertical alignment. The left and right images are cropped in such a way the vertical coordinates of the cropped left image and the vertical coordinates cropped right image are aligned.

In an embodiment, the left image sensor 330b with the left lens 340b that are worn by the user may capture a left image. The right image sensor 330a with the right lens 340a that are worn by the user may capture a right image. The left image and the right image may be provided to the controller 310. The controller 310 may crop the left image to generate a cropped left image. The controller 310 may crop the right image to generate a cropped right image and may preserve the vertical alignment of the cropped right image with respect to the cropped left image. The controller 310 may resize the cropped left image to generate a cropped and resized left image. The controller 310 may resize the cropped right image to generate a cropped and resized right image. The near-eye 3D display 320 worn by the user may display the cropped and resized left image to the left eye of the user. The near-eye 3D display 320 worn by the user may display the cropped and resized right image to the right eye of the user. It should be appreciated that the controller can be a microcontroller, a computer, a field-programmable gate array (FPGA), an application specific integrated circuits (ASIC), or a combination thereof.

In one embodiment, the left image sensor and right image sensor are identical image sensors. The image sensors may use the same type of image lenses. The left and right image sensors may be placed and calibrated, so that the left image captured and right image captured are vertically aligned, prior to any digital magnification process. The digital magnification process preserve the vertical alignment. For example, assuming the left image and right image each have 800 (horizontal, column) by 600 (vertical, row) pixels. After digital magnification, the row 201 to row 400 of pixels of left image to generate a cropped left image, and the row 201 to row 400 of pixels of the right image are used to generate a cropped right image. Therefore, the vertical alignment is preserved.

In one embodiment, the left image sensor and right image sensor are not identical image sensors. In this case, the left image captured and right image captured are first calibrated and aligned vertically, prior to any digital magnification process. For example, assuming the left image captured by the left image sensor have 800 (horizontal, column) by 600 (vertical, row) pixels, but the right image captured by the right image sensor have 400 (horizontal) by 300 (vertical) pixels. The left image and right image are first vertically aligned. For instance, the row #0, 200, 400, 600 of the left image may correspond to the row #0, 100, 200, 300 of the right image, respectively. After digital magnification, a subset of the row 200 to row 400 of pixels of left image, and a subset of the row 100 to row 200 of pixels of the right image are used. Therefore, the vertical alignment is preserved.

Figure 5:
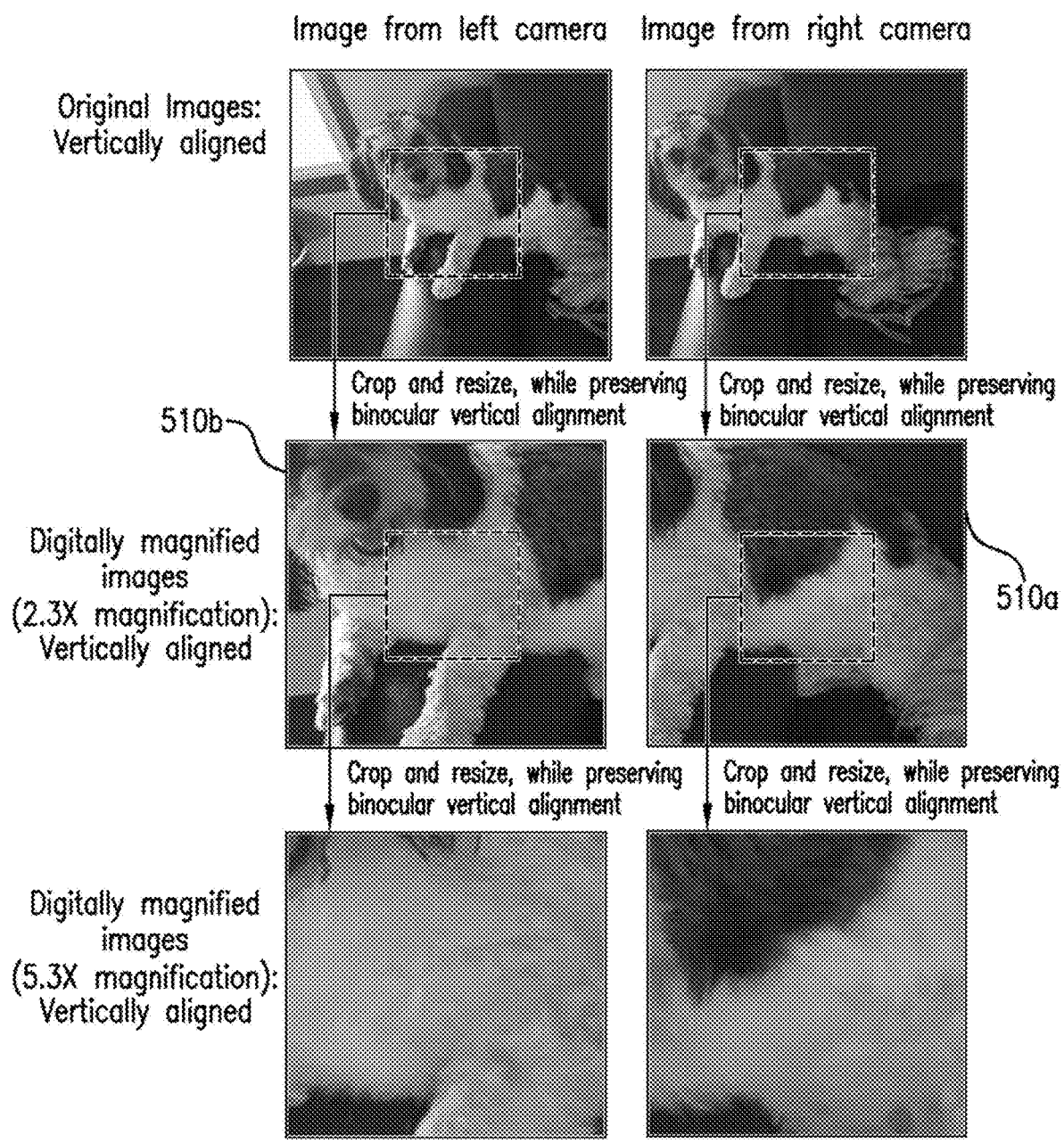
FIG. 5 depicts a schematic diagram of a digital magnification with binocular vertical alignment preservation configuration where the magnified left images and the magnified right images are vertically aligned thereby resulting in increased 3D visualization.

FIG. 5 depicts a schematic diagram of a digital magnification with binocular vertical alignment preservation configuration 500 where the magnified left images and the magnified right images are vertically aligned thereby resulting in increased 3D visualization. The digital magnification with binocular vertical alignment preservation configuration 500 includes the zoomed right images 510b are vertically aligned with the zoomed left images 510a thereby resulting in increased 3D visualization.

Digital Magnification with Preservation of Binocular Overlap

Figure 6:
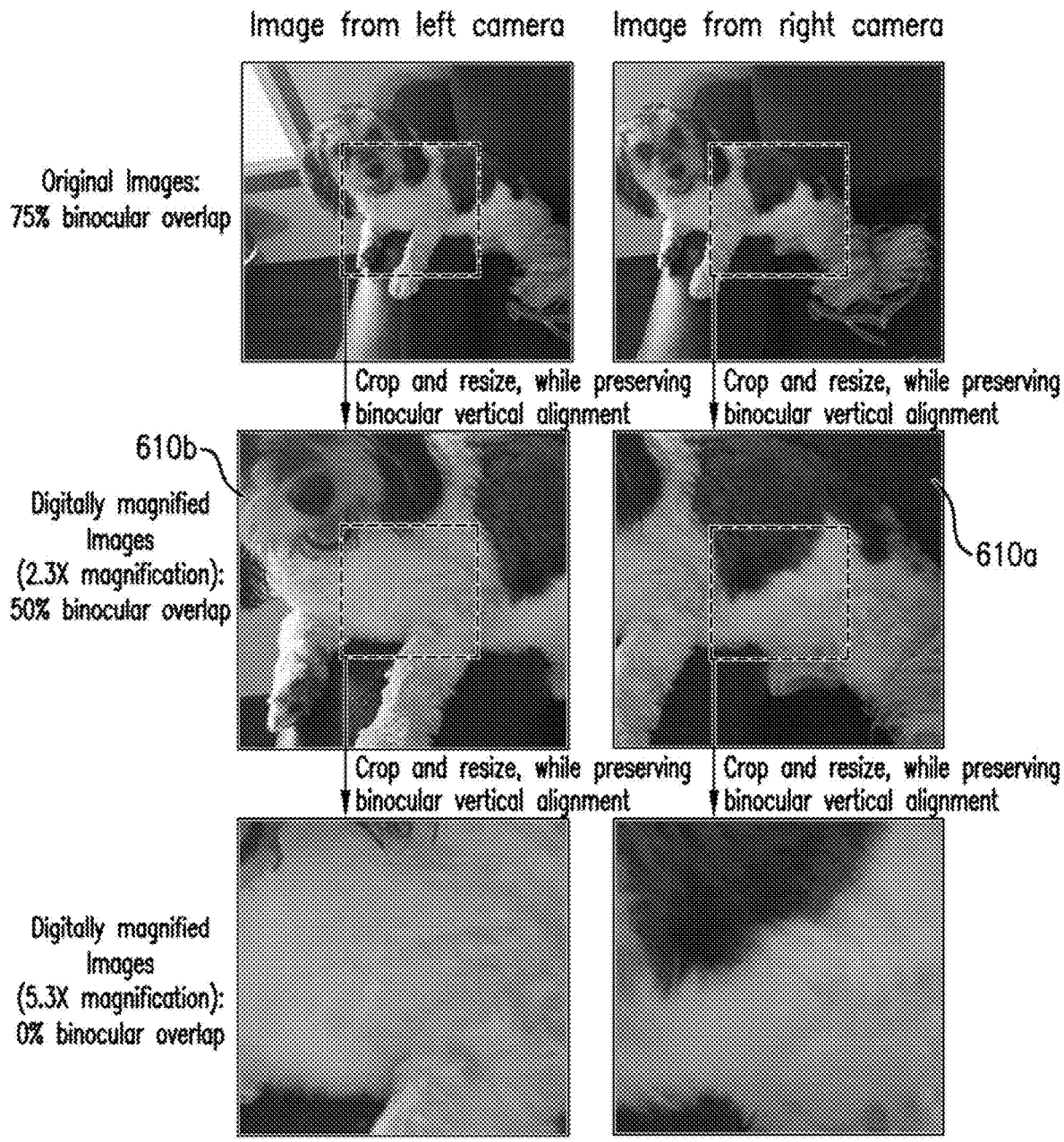
FIG. 6 depicts a schematic view of a digitally magnified stereo images with preservation of vertical alignment configuration whereas the digital magnification is applied, binocular overlap between the cropped left images and cropped right images gradually decreases.

FIG. 6 depicts a schematic view of a digitally magnified stereo images with preservation of vertical alignment configuration 600 whereas the digital magnification is applied, binocular overlap between the cropped left images and cropped right images gradually decreases. The digitally magnified stereo images with preservation of vertical alignment configuration 600 includes digitally magnified right images 610a are vertically aligned with the digitally magnified left images 610b. For example, at a 2.3× magnification, the binocular overlap decreases from 75% to 50% resulting in a decrease in 3D visualization. At a 5.3× magnification, the binocular overlap decreases from 75% to 0%. The vertical alignment preservation without the preservation of binocular overlap may result in the gradual decrease in binocular overlap with each digital magnification.

After executing a first digital magnification at a first digital magnification level on the first image captured by the first image sensor 330b and on the second image captured by the second image sensor 330a, the controller 310 may maintain the binocular overlap generated by adjusting the cropping of the first image and the second image to satisfy the overlap threshold. In one aspect, during the digital magnification process a fixed binocular overlap number is maintained, such as 80%, 90% or 100%. In another aspect, during the digital magnification process a range of binocular overlap number is maintained, such as 60%-90%.

The controller 310 may execute a second digital magnification at a second digital magnification level on the first image captured by the first image sensor 330a and the second image captured by the second image sensor 330b. The second digital magnification level is increased from the first digital magnification level. The controller 310 may maintain the binocular overlap generated after executing the first digital magnification at the first digital magnification level on the first image and the second image when executing the second digital magnification at the second digital magnification level.

After executing each previous digital magnification at each previous digital magnification level on the first image and the second image, the controller 310 may maintain the binocular overlap and the vertical alignment determined when executing the first digital magnification at the first digital magnification level on the first image and the second image. The controller 310 may continue to maintain the binocular overlap and the vertical alignment determined from the adjusting of the cropping of the first image and the second image to satisfy the overlap threshold after executing the first digital magnification at the first digital magnification level on the first image and the second image for each subsequent digital magnification level. Each subsequent digital magnification level is increased from each previous digital magnification level. For example, the overlap threshold may be satisfied when the binocular overlap includes 75% overlap of the first image and the second image is maintained for each subsequent digital magnification at each subsequent digital magnification level. In one embodiment, each subsequent digital magnification from the previous magnification level (e.g. increase from 1× to 2×, and increase 2× to 4×) may be a recursive function.

The controller 310 may execute first digital magnification at the first digital magnification level on a non-concentric portion of the first image and a non-concentric portion of the second image. The non-concentric portion of the first image and the second image is a portion of the first image and the second image that differs from a center of the first image and the second image. The controller 310 may adjust the cropping of the first image and the second image to provide binocular overlap of the non-concentric portion of the first image and the non-concentric portion of the second image. The binocular overlap of the non-concentric portion of the first image and the non-concentric portion of the second image satisfies the overlap threshold either specified as a fixed number or a range. The controller 310 may continue to crop a non-concentric portion of the first image and a non-concentric portion of the second image for each subsequent digital magnification at each subsequent digital magnification level. The binocular overlap of the non-concentric portion of the first image and the non-concentric portion of the second image is maintained from the first digital magnification at the first digital magnification level.

The non-concentric portion of the first image and the non-concentric portion of the second image may be resized to display to the user. In one aspect, at each magnification level, a first center of cropping of the non-concentric portion of the first image and a second center of cropping of the non-concentric portion of the second image are determined by the system 300. In one embodiment, the first center of cropping is fixed at the particular part of the first image, and second center of cropping at each magnification level is determined based on the location of the corresponding first center of cropping and the targeted binocular overlap. It should be appreciated that in some embodiment and at one or more magnification level, the digital magnification on either left image or right image may be concentric. For example, digital magnification on the left image is concentric but the digital magnification on the right image is non-concentric to maintain the binocular overlap.

In one embodiment, the left image sensor and right image sensor are identical image sensors. The image sensors may use the same type of image lenses, including autofocus lenses. The left and right image sensors may be placed and calibrated, so that the left image captured and right image captured are vertically aligned, prior to any digital magnification process. The digital magnification process preserves the vertical alignment and binocular overlap (e.g. 80%). For example, assuming the left image and right image each have 800 (horizontal, column) by 600 (vertical, row) pixels. After digital magnification, the pixels from row 201 to row 400 and column 401 to column 600 of left image are used to generate a cropped left image, and the row 201 to row 400 and column 201 to column 400 of right image are used to generate a cropped right image. This cropping may generate a satisfactory binocular overlap (e.g. 80%). The non-concentric cropping in the digital magnification combined with resizing may enable magnification while preserving of both binocular overlap and vertical alignment. Similarly, when the system increase to a higher digital magnification level, further non-concentric cropping on at least one of the image (e.g. left or right images) are performed in conjunction with resizing to enable magnification while preserving of both binocular overlap and vertical alignment In another example, machine learning algorithms are used for determining a center of cropping for the left image, or a center of cropping for the right image, or both centers, during the digital magnification process. In one aspect, object recognition and localization based on machine learning (e.g. recognize surgical field, or recognize surgical instrument, or recognize tissues, etc.) may determine at least one center of the cropping. For example, the surgical bed is recognized and localized based on the left image, and a location within the surgical bed (e.g. centroid) is assigned to be the center of cropping for the left image, and the center of cropping for the right image is calculated based on the center of cropping for the left image and the desirable binocular overlap to be maintained.

In one aspect, supervised learning can be implemented. In another aspect, unsupervised learning can be implemented. In yet another aspect, reinforcement learning can be implemented. It should be appreciated that feature learning, sparse dictionary learning, anomaly detection, association rules may also be implemented. Various models may be implemented for machine learning. In one aspect, artificial neural networks are used. In another aspect, decision trees are used. In yet another aspect, support vector machines are used. In yet another aspect, Bayesian networks are used. In yet another aspect, genetic algorithms are used.

In yet another example, neural networks, convolutional neural networks, or deep learning are used for object recognition, image classification, object localization, image segmentation, image registration, or a combination thereof. Neural network based systems are advantageous in many cases for image segmentation, recognition and registration tasks.

In one example, U-Net is used, which has a contraction path and expansion path. The contraction path has consecutive convolutional layers and max-pooling layer. The expansion path performs up-conversion and may have convolutional layers. The convolutional layer(s) prior to the output maps the feature vector to the required number of target classes in the final segmentation output. In one example, V-net is implemented for image segmentation to isolate the organ or tissue of interest (e.g. vertebral bodies). In one example, Autoencoder based Deep Learning Architecture is used for image segmentation to isolate the organ or tissue of interest. In one example, backpropagation is used for training the neural networks.

In yet another example, deep residual learning is performed for image recognition or image segmentation, or image registration. A residual learning framework is utilized to ease the training of networks. A plurality of layers is implemented as learning residual functions with reference to the layer inputs, instead of learning unreferenced functions. One example of network that performs deep residual learning is deep Residual Network or ResNet.

In another embodiment, a Generative Adversarial Network (GAN) is used for image recognition or image segmentation, or image registration. In one example, the GAN performs image segmentation to isolate the organ or tissue of interest. In the GAN, a generator is implemented through neural network to models a transform function which takes in a random variable as input and follows the targeted distribution when trained. A discriminator is implemented through another neural network simultaneously to distinguish between generated data and true data. In one example, the first network tries to maximize the final classification error between generated data and true data while the second network attempts to minimize the same error. Both networks may improve after iterations of the training process.

In yet another example, ensemble methods are used, wherein multiple learning algorithms are used to obtain better predictive performance. In one aspect, Bayes optimal classifier is used. In another aspect, bootstrap aggregating is used. In yet another aspect, boosting is used. In yet another aspect, Bayesian parameter averaging is used. In yet another example, Bayesian model combination is used. In yet another example, bucket of models is used. In yet another example, stacking is used. In yet another aspect, a random forests algorithm is used. In yet another aspect, a gradient boosting algorithm is used.

The controller 310 may determine a distance that the first image sensor 330*b* and the second image sensor 330*a* is positioned from the target. The controller 310 may execute the cropping of the first image and the second image to maintain the vertical alignment and the binocular overlap for each digital magnification at each digital magnification level based on the distance of the first image sensor 330*b* and the second image sensor 330*a* is from the target.

In another embodiment, the system allows the user to determine a center of cropping for the left image, or a center of cropping for the right image, or both centers, for the digital magnification process. In the case of many users, each may have their own settings.

The display 320 may include one of a plurality of wearable display that displays the resized and cropped first image and the resized and cropped second image to display the 3D image of the target after the digital magnification is executed that includes the binocular overlap of the first image and the second image that are vertically aligned to satisfy the overlap threshold. In one aspect, the first image sensor 330*b* and the second image sensor 330*a* may be positioned proximate the display 320 for the user to execute a surgical procedure on the target that is a patient. In another aspect, the first image sensor 330*b* and the second image sensor 330*a* may be positioned close to the display 320 for the user to execute a surgical procedure on the target that is a patient. In another example, the first image sensor 330*b* and the second image sensor 330*a* may be positioned on a stand, not adjacent to the display 320. It should be appreciated that the said stand may be motorized or has a robot. The display 320 may be a 3D monitor, a 3D projector, or a 3D projector with a combiner, used with 3D glasses (e.g. polarizers or active shutter glasses).

The present invention discloses a method for digitally magnifying the images, while preserving the binocular overlap. In one embodiment, the cropping of left image and cropping of right image may be performed by the controller 310 with the binocular overlapped preserved. For example, if the original left image and right image have an original binocular overlap of 75%, the cropped left image and cropped right image may be cropped by the controller 310 in such a way so that the binocular overlap of cropped images will also be 75%.

In an embodiment, the left image sensor 330*b* with the left lens 340*b* that are worn by the user may capture a left image. The right image sensor 330*a* with the right lens 340*a* that are worn by the user may capture a right image. The left image and the right image may be provided to the controller 310. The controller 310 may calculate a left crop function that specifies how to crop the left image and a right crop function that specifies how to crop the right image. The left crop function and the right crop function preserve binocular overlap and binocular vertical alignment. The controller 310 may crop the left image to generate a cropped left image using the left crop function that preserves binocular overlap and binocular vertical alignment. The controller 310 may crop the right image to generate a cropped right image using the right crop function that preserves binocular overlap and binocular vertical alignment.

The controller 310 may resize the cropped left image to generate a cropped and resized left image. The controller 310 may resize the cropped right image to generate a cropped and resized right image. The display 320 worn by the user may display the cropped and resized left image to the left eye of the user. The display 320 may display the cropped and resized right image to the right eye of the user. In one aspect, the display 320 may be a near-eye 3D display. In another aspect, the display 320 may be a 3D monitor, a 3D projector, or a 3D projector with a combiner, used with 3D glasses (e.g. polarizers or active shutter glasses).

FIG. 7 depicts a schematic view of a preservation of binocular overlap and binocular vertical alignment configuration 700 where at 2.3×, 5.3×, and 12× magnifications, respectively, the left cropped images and the right cropped images have binocular overlap of 75% and vertical alignment thereby resulting in an increased 3D visualization experience and depth perception may be provided to the user. The preservation of binocular overlap and binocular vertical alignment configuration 700 includes right cropped images 710*b* and left cropped images 710*a*.

In another embodiment, the digital magnification method further comprises of an additional condition to satisfy: the left cropped image shares the same geometrical center as that of the left original image. The right cropped image may be calculated by the controller 310 and generated accordingly by the controller 310 based on the cropping of the left cropped image, while preserving the binocular overlap and binocular vertical alignment. The benefit of this implementation is: the digital magnification process may be coaxial along the center of the left image (the optical axis), and the progression of digital magnification may align with the line of sight of the user's left eye. Alternatively, the cropped right image may share the same center as the right original image. The left cropped image may be calculated by the controller 310 and generated accordingly by the controller 310 based on the position and cropping of the right cropped image, while preserving the binocular overlap and binocular vertical alignment.

In another embodiment, the acceptable binocular overlap of cropped images may be specified as a range, rather than a specific number. For instance, the binocular overlap of cropped left and right images may be specified to be within a range between 60% to 90%. Any number between 60% and 90% may be considered satisfactory for digital magnification. With an acceptable range of binocular overlap as a guideline for cropping left and right images, the left image sensor 330*b* with the left lens 340*b* that are worn by the user controller 310 may capture a left image. The right image sensor 330*a* and the right lens 340*a* that are worn by the user may capture a right image. The left image and the right image may be provided to the controller 310.

The controller 310 may calculate a left crop function that specifies how to crop the left image and the right crop function that specifies how to crop the right image. The left crop function and the right crop function may preserve binocular vertical alignment. The left crop function and the right crop function may preserve binocular overlap as specified by a range of acceptable binocular overlap, such as 60% to 90%. The controller 310 may crop the left image to generate a cropped left image using the left crop function that preserves binocular overlap and binocular vertical alignment. The controller 310 may crop the right image to generate a cropped right image using the right crop function that preserves binocular overlap and binocular vertical alignment. The controller 310 may resize the cropped left image to generate a cropped and resized left image. The controller 310 resizes the cropped right image to generate a cropped and resized right image. The display 320 may display the cropped and resized left image to the left eye of the user. The display 320 may display the cropped and resized right image to the right eye of the user.

In another embodiment, the left lens 340b and right lens 340a may be zoom lenses. The focal length and angle of view of zoom lenses may be varied, enabling optical zoom. Therefore, optical zoom may be used in conjunction with the aforementioned digital magnification methods. For example, 5.3× digital magnification may be used in conjunction with 2× optical zoom (10.6× magnification in total). It should be appreciated that the levels of digital magnification may be either continuous (e.g. magnifying with fine level of increments over a range: e.g. any magnification level within 2×-7×), or the magnification levels may be discrete (2×, 2.5×, 3×, 4×, 6×, 7×, etc). In another embodiment, the controller 310 may transmit the magnified left image and/or right image to another 3D display device for visualization. The 3D display device may be a wearable display, a monitor, a projector, a projector with a combiner, a passive 3D monitor with 3D polarized glasses, a active 3D monitor with active shutter 3D glasses, or a combination thereof. In yet another embodiment, the controller 310 may transmit the magnified left image and/or right image to another computer for visualization, storage, and broadcast. In yet another embodiment, the controller 310 may record the magnified left image and/or magnified right image.

In yet another embodiment, the controller 310 may apply computer vision and/or image processing techniques the magnified left image and/or magnified right image. Additional computer vison analysis can enable decision support, object recognition, image registration, and object tracking. For example, deep learning and neural networks may be used. In yet another embodiment, the near-eye 3D display 320 may display other medical image data to the user (e.g. CT, MRI, ultrasound, nuclear medicine, surgical navigation, fluoroscopy, etc) and the other medical image data is overlaid with the magnified left image and/or magnified right image. It should be further appreciated that more than two image sensors may be used in the system. In one example, when there are more than two image sensors, at any given moment, only two image sensors are selected to participate in the digital magnification process. (e.g. three color sensors with three lenses). It should be appreciated that in case of multiple image sensors and image lenses, multiple sets consisting of two of those sensors may be calibrated with respect to each other in separate processes.

In one embodiment, only one image sensor is used. This image sensor will serve as both left image sensor 330a and right image sensor 330b. In another embodiment, a 3D scanning unit comprising of a projector and an image sensor is used, similar to a 3D scanner. A 3D scan can be thus generated. The 3D scanning unit may use epipolar geometry for the 3D scan. By using different virtual viewpoints and projection angles, a virtual left image and virtual right image can be generated based on the 3D scan. The digital magnification process aforementioned may be applied to the virtual left image and virtual right image.

Apparatuses and Systems for Digital Magnification and 3D Augmented Reality Display FIG. 8 depicts a schematic view a physical embodiment of a digital magnification wearable device configuration 800. The digital magnification wearable device configuration 800 includes the right image sensor 330a, the left image sensor 330b, the right lens 340a, the left lens 340b, the right near-eye display 320a, the left near-eye display 320b, and an eyeglass frame 350. It should be appreciated that the wearable frame may be in the form of a head mount, in lieu of an eyeglass frame. It should be appreciated that the controller 310 may be a microcontroller, a computer, an FPGA, or an ASIC. The digital magnification wearable device configuration 800 may execute digital magnification with preservation of binocular overlap and binocular vertical alignment.

In one embodiment, the digital magnification wearable device configuration 800 may further include transparent plastic or glass, surrounding the left near eye display 320b and right near eye display 320a. For example, the digital magnification wearable device configuration 800 may use a compact offset configuration, whereby only a part of area before each eye is none-transparent and the other parts are transparent. In one example, the center part of area before each eye is none-transparent and the peripheral parts are transparent. This way, the user such as surgeon/dentist can see around the near eye digital display to look at the patient with unhindered natural vision. In one embodiment, the digital magnification wearable device configuration 800 may further include prescription eyeglasses, so that near-sightedness, farsightedness, and astigmatism may be corrected.

In another embodiment, the digital magnification wearable device configuration 800 may include an optical see-through configuration. The near-eye 3D displays 320(a-b) are both transparent or semi-transparent. In one embodiment, the image sensors 330(a-b) may be a pair of color image sensors. Thus, the digital magnification wearable device configuration 800 may digitally magnify stereoscopic color images and display to the user in the near-eye 3D display 320(a-b) in 3D. In one example, the left and right lenses 340(a-b) are lenses with fixed focal lengths. In another example, the left and right lenses 340(a-b) are zoom lenses with variable focal lengths. In another example, the color image sensors may be complementary metal-oxide-semiconductor (CMOS) image sensors. In yet another example, the color image sensors may be charge-coupled device (CCD) image sensors. In one example, the left and right color image sensors are coupled with autofocus lense to enable autofocus.

In one embodiment, only one image sensor is used. This image sensor will serve as both left image sensor 330a and right image sensor 330b. In another embodiment, a 3D scanning unit comprising of a projector and an image sensor is used, similar to a 3D scanner. A 3D scan can be thus generated. The 3D scanning unit may use epipolar geometry for the 3D scan. By using different virtual viewpoints and projection angles, a virtual left image and virtual right image can be generated based on the 3D scan. The digital magnification process aforementioned may be applied to the virtual left image and virtual right image. The 3D scanning unit may use visible wavelengths, infrared wavelengths, ultraviolet wavelengths, or a combination thereof.

The aforementioned 3D scanning unit may project dynamic projection pattern to facilitate 3D scanning. A few examples of dynamic patterns are binary code, stripe boundary code, and miere pattern. In one embodiment, binary codeword is represented by a series of black and white stripes. If black represents 1 and white represents 0, the series of 0 and 1 at any given location may be encoded by the dynamic projection pattern; the binary dynamic projection pattern may be captured by the image sensor and lens, and decoded to recover the binary codeword that encodes an location (e.g. 10100011). In theory, N binary patterns may generate 2N different codewords per image dimension (x or y dimension). Similarly, binary coding may be extended to N-bits coding. For example, instead of binary case where only 1 and 0 are represented by black and white, a N-bits integer may be represented by an intensity in between. For instance, if it is a 2-bit encoding system, 2*2=4 different possibilities. If maximum intensity is I, 0,1,2,3 can be represented by I, 2/3*I, 1/3*I, and 0, respectively. In other examples, dynamic stripe boundary code-based projection or the dynamic Moire code-based projection can be implemented.

In another embodiment, dynamic Fourier transform profilometry may be implemented by 3D scanning unit. In one aspect, periodical signals are generated to carry the frequency domain information including spatial frequency and phase. Inverse Fourier transform of only the fundamental frequency results in a principle phase value ranging from $-\pi$ to $\pi$. After spatial or temporal phase unwrapping (The process to remove $\pi$ discontinuities and generate continuous map), actual 3D shape of patient anatomy may be recovered. Fourier transform profilometry is less sensitive to the effect of out-of-focus images of patients, making it a suitable technology for intraoperative 3D scanning. Similarly, $\pi$-shifted modified Fourier transform profilometry may be implemented intraoperatively, where a $\pi$-shifted pattern is added to enable the 3D scanning.

In another example, a DC image may be used with Fourier transform profilometry in the 3D scanning unit. By capturing the DC component, the DC-modified Fourier transform profilometry may improve 3D scan quality intraoperatively. In another example, N-step phase-shifting Fourier transform profilometry may be implemented intraoperatively. It should be appreciated that the larger the number of steps (N) is chosen, the higher the 3D scanning accuracy. For instance, three-step phase-shifting Fourier transform profilometry may be implemented to enable high speed 3D scanning intraoperatively. It should be appreciated that periodical patterns such as trapezoidal, sinusoidal, or triangular pattern may be used in the Fourier transform profilometry for intraoperative 3D scan. It should be further appreciated that windowed Fourier transform profilometry, two-dimensional Fourier transform profilometry, or wavelet Fourier transform profilometry may also be implemented by the aforementioned apparatuses and systems. It should be appreciated more than one frequency of periodical signal (e.g. dual frequencies) may be used in the modified Fourier transform profilometry, so that phase unwrapping become optional in the intraoperative 3D scan. The dynamic Fourier transform profilometry and modified Fourier transform profilometry discussed herein may improve the quality of 3D scan of the patient. Improved 3D scan may enhance the image registration between intraoperative 3D scan and preoperative images (e.g. MRI and CT), thereby improving the surgical navigation.

In yet another embodiment, the aforementioned 3D scanning unit implements Fourier transform profilometry or modified Fourier transform profilometry, in combination with binary codeword projection. The Fourier transform profilometry and binary codeword projection may be implemented sequentially, concurrently, or a combination thereof. The combined approach may improve the 3D scanning accuracy, albert at the cost of 3D scanning speed.

In another embodiment, the aforementioned projector may include at least one lens. The lens is configured such a way so that the projected pattern(s) are defocused. The defocusing process by the lens is similar a convolution of gaussian filter on the binary pattern. Consequently, the defocused binary pattern may create periodical patterns that are similar to sinusoidal patterns.

In another example, dithering techniques are used to generated high-quality periodical fringe patterns through binarizing a higher order bits fringe pattern (e.g. 8 bits) such as sinusoidal fringe patterns. In one example, ordered dithering is implemented; for example, Bayer matrix can be used to enable ordered dithering. In another example, error-diffusion dithering is implemented; for instance, Floyd-Steinberg (FS) dithering or minimized average error dithering may be implemented. It should be appreciated that in some cases the dithering techniques may be implemented in combination with defocusing technique to improve the quality of intraoperative 3D scan.

In another example, the aforementioned projector may generate statistical pattern. For instance, the projector may generate a pseudo random pattern that includes a plurality of dots. Each position of each corresponding dot included in the pseudo random pattern may be pre-determined by the projector. The projector may project the pseudo random pattern onto the patient or target. Each position of each corresponding dot included in the pseudo random pattern is projected onto a corresponding position on the patient/target. The image sensor may capture a 2D intraoperative image of a plurality of object points associated with the patient/target, to calculate the 3D topography.

The controller 310 may associate each object point associated the patient that is captured by the image sensor with a corresponding dot included in the pseudo random pattern that is projected onto the patient/target by the projector based on the position of each corresponding dot as pre-determined by the projector. The controller 310 may convert the 2D image to the 3D scan of the patient/target based on the association of each object point to each position of each corresponding dot included in the pseudo random pattern as pre-determined by the projector. In one example, the projector may include one or more edge emitting laser, at least one collimating lens, and at least one diffractive optics element. The edge emitting laser and the diffractive optics element may be controlled by the controller 310 to generate patterns desirable for the specific 3D scanning applications.

It should be appreciated that the near eye 3D display may comprise LCD (liquid crystal) microdisplays, LED (light emitting diode) microdisplays, organic LED (OLED) microdisplays, liquid crystal on silicon (LCOS) microdisplays, retinal scanning displays, virtual retinal displays, optical see through displays, video see through displays, convertible video-optical see through displays, wearable projection displays, and the like. In another example, the digital magnification wearable device configuration 800 may further include a light source for surgical field illumination. In one example, the light source is based on one or a plurality of light emitting diode (LED). In another example, the light source is based on one or a plurality of laser diode with waveguide or optical fiber. In another example, the light source has a diffuser. In another example, the light source has noncoherent light source such as an incandescent lamp. In yet another example, the light source has coherent light source such as a laser diode and phosphorescent materials in film form or volumetric form. In yet another embodiment, the light source is mounted on a surgical instrument to illumination of the cavity.

In another embodiment, the image sensors 330(*a-b*) are a pair of monochrome sensors. The systems further include a least one fluorescence emission filter. Thus, the digital magnification surgical loupe configuration may digitally magnify stereoscopic fluorescence images and display to the user in the near-eye 3D display 320(*a-b*) in 3D. The systems further include a light source that is capable of provide excitation light to the surgical field. It should also be appreciated that the light source may include a laser light; a light emitting diode (LED); an incandescent light; a projector lamp; an arc-lamp, such as xenon, xenon mercury, or metal halide lamp; as well as coherent or in-coherent light sources. In one example, the light source comprises of one or a plurality of white LEDs with a low pass filter (e.g. 775 nm short pass filter) and one or a plurality of near infrared LEDs with a band pass filter (e.g. 830 nm band pass filter). In another example, the light source comprises of one or a plurality of white LEDs with a low pass filter (e.g. 775 nm short pass filter) and one or a plurality of near infrared LEDs with a long pass filter (e.g. 810 nm long pass filter). In one example, the light source can be controlled by sensors such as an inertial measurement unit to turn the light on and off.

In another embodiment, the digital magnification wearable device configuration 800 includes at least two color image sensors, at least two monochrome image sensors, at least two beamsplitters, and at least two narrow band filters. The monochrome image sensor, the color sensor and the beamsplitter are optically aligned on each side (left vs right), so that the left color image is aligned with the left monochrome image, and the right color image is aligned with the right monochrome image. It should be appreciated that the beamsplitters can be cube beamsplitters, plate beamsplitters, Pellicle Beamsplitters, Dichroic Beamsplitters, or polarizing beamsplitters. It should be appreciated that the optical design can be in a folded configuration using mirrors.

In another example, the digital magnification wearable device configuration 800 includes a light source with an additional spectral filter. The digital magnification wearable device configuration 800 may be used to capture narrow band reflectance images or fluorescence images, and to digitally magnify the image and display to the user in 3D with desirable binocular overlap. For example, the light source may be a plurality of white LEDs and near infrared LEDs (770 nm), and the spectral filter can be a 800 nm short pass filter. In another embodiment, the apparatus further includes additional sensors, such as an inertial measurement unit (IMU), accelerometers, gyroscopes, magnetometers, proximity sensors, microphone, force sensors, ambient light sensors, etc. In one example, the light source can be controlled by sensors such as an inertial measurement unit to turn the light on and off. In another example, the system 300 can be controlled by sensors such as an inertial measurement unit and/or proximity sensor to turn the system 300 on and off. Some example of types of proximity sensors are: Photoelectric, Inductive, Capacitive and Ultrasonic.

In one embodiment, the digital magnification wearable device configuration 800 further include at least one microphone. The system 300 may record audio data such as dictation. The system 300 capture the audio data using the microphone, perform voice recognition on the controller 310, and enable voice control of the system 300. In one aspect, the voice control may include adjustment of the magnification levels (e.g. from 3× to 5×). In one example, a microphone array or multiple microphones are used, the system may triangulate the source of sound for multiple purposes such as noise cancellation, voice control of multiple devices in close proximity, etc. The system 300 may differentiate the one user from other users based on the triangulation of voice/audio signal. In yet another embodiment, the digital magnification wearable device configuration 800 further includes tracking hardware, such as optical tracking hardware, electromagnetic tracking hardware, etc. In yet another embodiment, the digital magnification wearable device configuration 800 further includes of communication hardware, to enable wireless or wired communication such as such as Wi-fi, Bluetooth, cellular communication, Ethernet, LAN, wireless communication protocols compatible with operating rooms, infrared communication. The apparatus can thus stream the magnification data and/or the original image data captured by the image sensors to another apparatus, computer or mobile devices. In yet another embodiment, the lenses 340(*a-b*) in the digital magnification wearable device configuration 800 include autofocus lenses.

In yet another embodiment, the lenses 340(*a-b*) in the digital magnification wearable device configuration 800 are autofocus lenses but the digital magnification wearable device configuration 800 may focus the lenses, on request of the user. For example, upon user request via an input device or via voice control, the lenses will be focused on the demand of the user. Thus, the autofocus will not be activated unless demanded by the user, thus avoiding unwanted autofocus during surgical procedures. In one example, the focus setting of the left lens 340*b* and right lens 340*a* are always the same. For example, the settings for focusing left lens 340*b* and the settings for right lens 340*a* are set to be the same, to avoid left lens focusing on a focal plane different from the right plane.

In yet another embodiment, the digital magnification wearable device configuration 800 further includes additional input devices, such as a foot pedal, a wired or a wireless remote control, one or more button, a touch screen, microphone with voice control, gesture control device such as Microsoft Kinect, etc. It should be appreciated that the controller can be useable or disposable. It should be appreciated that a sterile sheet or wrap may be placed around the input device. In yet another embodiment, the digital magnification wearable device configuration 800 may display medical images such as MRI (magnetic resonance image) image data, computed tomography (CT) image data, positron emission tomography (PET) image data, single-photon emission computed tomography (SPECT), PET/CT, SPECT/CT, PET/MRI, gamma scintigraphy, X-ray radiography, ultrasound, and the like. In yet another embodiment, the digital magnification wearable device configuration 800 may include digital storage hardware, to enable recording the magnification data, and/or the original image data from image sensors, and/or audio data, and/or other sensor data.

Image Stabilization

In one example, electronic image stabilization (EIS) is implemented by the Controller 310. The Controller 310 shifts the electronic image from frame to frame of left video captured by the left camera and the right video captured by the right camera, enough to counteract the motion. EIS uses pixels outside the border of the cropped area during digital magnification to provide a buffer for the motion. In one aspect, optical flow or other image processing methods may be used to track subsequent frames and detect vibrational movements and correct for them. In another aspect, feature-matching image stabilization methods may be used. Image features may be extracted via SIFT, SURF, ORB, BRISK, neural networks, etc.

In another example, Optical Image Stabilization (OIS) is implemented. In one aspect, the OIS in the lenses 340*a* and 340*b*. For instance, using springs and mechanical mount, image sensor movements are smoothened or cancelled out. In one aspect, the image sensors 330*a* and 330*b* can be moved in such a way as to counteract the motion of the camera.

In yet another example, mechanical image stabilization (MIS) is implemented. Gimbals may be used for MIS. In one instance, MIS is achieved by attaching a gyroscope to the system. He gyroscope lets the external gyro (gimbal) stabilize the image sensors 330*a* and 330*b*.

Stereoscopic Calibration

The system 300 may need stereoscopic calibration to enable accurate 3D digital magnification. In one example, after mechanical fixture to achieve vertical calibration, a single calibration (through repeated capture of similar calibration pattern such as fiducials or chessboard) on left and right sensors, based on that an initial homography transformation and cropping is applied to the pair of images to achieve a high accuracy alignment between the two in executed. This is similar to finding the epipolar geometry between two sensors and bringing the two frames into a single plane through calibration to have: (1) Identical scales of the captured geometry, through virtual identical focal length, (2) Identical peripheral alignment of captured scene, through undistortion, and (3) Identical vertical alignment of captured frames, through homography (projective) transformation. The new calibrated frames (rectified frames) may be used for subsequent digital 3D magnification and visualization processes, as previously described.

Ergonomic Calibration

In one aspect, ergonomic calibration can be performed on the system 300 using one or a plurality of IMUs, one on the image sensor axis and second one on the display axis. Two important objectives are achieved in capturing and displaying the digital images: the headset is horizontally aligned in the center of the forehead (single IMU reading and correction). This is essential to have a symmetrical mechanical position for each image sensor 330a and 330b with respect to each corresponding eye (left sensor 330a to left eye and right sensor 330b to right eye). It also helps achieve maintain binocular overlap between the digitally magnified images captured and overlapped in the center of the two image sensors (by comparing and aligning the two IMUs), and the center of the two eyes which is perceived by natural vision around the displays.

Autofocus and Autofocus On-Demand

Autofocus can be achieved through mechanical structure such as motors/actuators or through liquid lenses. In one example, the controller 310 may conduct brightness assessment to find a high contrast image, high frequency values, etc. through a method of Sobel filter or similar that extracts edges and high frequency features of the left and/or right images. The autofocus lens may test a large range of focus (course focus) to find a course focus, and subsequently conduct a smaller range of focus (fine focus) based in the neighborhood near the course focus. In one example, the right lens 340a and left lens 340b may be assigned to 2 ends of the focus range and progress towards the middle. Once the an optical focus value is found, both lenses will assigned the same value or similar value, to avoid 2 lenses focusing on different image planes.

In another example, the controller 310 may conduct using calibration and disparity map to find the working distance of desired object. The controller 310 may use previously calibrated frames to extract a partial or full disparity or depth map. Then controller 310 may use a region of interest or a point in a specific part of the image to assess the distance to the desired object or plane of operation (working distance), and use the distance to determine proper value for autofocus from either a distance dependent equation or a pre-determined look-up-table (LUT).

Additional Methods to Maintain Binocular Overlap During Digital Magnification

The binocular overlap may be defined as a variable of working distance and magnification level. By detecting and calculating the working distance of the patient/target from the image sensors 330a and 330b, the controller 310 can defining the proper value for binocular overlap between binocular views to achieve proper 3D visualization, from either a distance-dependent equation or a pre-determined look-up-table (LUT) after defining the distance to the point of interest or average working distance of the region of interest. In one instance, distance can be inferred using calibration and disparity map to find distance. Using previously calibrated frames to extract a partial or full disparity or depth map (the two are related but different numerical values). Then the controller 310 may use a region of interest or a point in a specific part of the image to extract the distance to the desired object or plane of operation (working distance), In another instance, the controller 310 may use autofocus values of left autofocus lens and/or right autofocus lens to inter the working distance.

Controller

The controller 310 comprises the hardware and software necessary to implement the aforementioned methods. In one embodiment, the controller 310 involves a computer-readable medium comprising processor-executable instructions configured to implement one or more of the techniques presented herein. An example embodiment of a computer-readable medium or a computer-readable device comprises a computer-readable medium, such as a SSD, CD-R, DVD-R, flash drive, a platter of a hard disk drive, etc., on which is encoded computer-readable data. This computer-readable data, such as binary data comprising at least one of a zero or a one, in turn comprises a set of computer instructions configured to operate according to one or more of the principles set forth herein. In some embodiments, the set of computer instructions are configured to perform a method, such as at least some of the exemplary methods described herein, for example. In some embodiments, the set of computer instructions are configured to implement a system, such as at least some of the exemplary systems described herein, for example. Many such computer-readable media are devised by those of ordinary skill in the art that are configured to operate in accordance with the techniques presented herein.

The following discussion provide a brief, general description of a suitable computing environment to implement embodiments of one or more of the provisions set forth herein. Example computing devices include, but are not limited to, personal computers that may comprise a graphics processing unit (GPU), server computers, hand-held or laptop devices, mobile devices (such as mobile phones, Personal Digital Assistants (PDAs), media players, and the like), multiprocessor systems, consumer electronics, mini computers, mainframe computers, a microcontroller, a Field Programmable Gate Array (FPGA), an application-specific integrated circuit (ASIC), distributed computing environments that include any of the above systems or devices, and the like. In one aspect, the controller may use a heterogeneous computing configuration.

Although not required, embodiments are described in the general context of "computer readable instructions" being executed by one or more computing devices. Computer readable instructions may be distributed via computer readable media. Computer readable instructions may be implemented as program components, such as functions, objects, Application Programming Interfaces (APIs), data structures, and the like, that perform particular tasks or implement particular abstract data types. Typically, the functionality of the computer readable instructions may be combined or distributed as desired in various environments.

In one example, a system comprises a computing device configured to implement one or more embodiments provided herein. In one configuration, the computing device includes at least one processing unit and one memory unit. Depending on the exact configuration and type of computing device, the memory unit may be volatile (such as RAM, for example), non-volatile (such as ROM, flash memory, etc., for example) or some combination of the two. In other embodiments, the computing device may include additional features and/or functionality. For example, the computing device may also include additional storage (e.g., removable and/or non-removable) including, but not limited to, cloud storage, magnetic storage, optical storage, and the like. In one embodiment, computer readable instructions to implement one or more embodiments provided herein may be in the storage. The storage may also store other computer readable instructions to implement an operating system, an application program, and the like. Computer readable instructions may be loaded in the memory for execution by the processing unit, for example.

The term "computer readable media" as used herein includes computer storage media. Computer storage media includes volatile and nonvolatile, removable and non-removable media implemented in any method or technology for storage of information such as computer readable instructions or other data. Computer storage media includes, but is not limited to, RAM, ROM, EEPROM, flash memory or other memory technology, CD-ROM, Digital Versatile Disks (DVDs) or other optical storage, magnetic disk storage or other magnetic storage devices, or any other medium which can be used to store the desired information and which can be accessed by computing device.

The computing device may also include communication connection(s) that allows the computing device to communicate with other devices. Communication connection(s) may include, but is not limited to, a modem, a Network Interface Card (NIC), an integrated network interface, a radio frequency transmitter/receiver, an infrared port, a USB connection, or other interfaces for connecting computing device to other computing devices. Communication connection(s) may include a wired connection or a wireless connection. Communication connection(s) may transmit and/or receive communication media.

The computing device may include input device(s) such as keyboard, mouse, pen, voice input device, touch input device, infrared cameras, depth cameras, touchscreens, video input devices, and/or any other input device. Output device(s) such as one or more displays, speakers, printers, and/or any other output device may also be included in the computing device. Input device(s) and output device(s) may be connected to the computing device via a wired connection, wireless connection, or any combination thereof. In one embodiment, an input device or an output device from another computing device may be used as input device(s) or output device(s) for computing device.

Components of computing device 6712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device may be interconnected by a network. For example, the memory may be comprised of multiple physical memory units located in different physical locations interconnected by a network.

Those skilled in the art will realize that storage devices utilized to store computer readable instructions may be distributed across a network. For example, a computing device accessible via a network may store computer readable instructions to implement one or more embodiments provided herein. Computing device may access another computing device and download a part or all of the computer readable instructions for execution. Alternatively, the first computing device may download pieces of the computer readable instructions, as needed, or some instructions may be executed at the first computing device and some at the second computing device.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail may be made without departing from the spirt and scope of the present disclosure. Thus the present disclosure should not be limited by any of the above-described exemplary embodiments, but should be defined only in accordance with the following claims and their equivalents.

What is claimed is:

1. A system for generating three-dimensional (3D) images from captured images of a target when executing digital magnification on the captured images to maintain the 3D images generated of the target after digital magnification, comprising:
   a first image sensor that is configured to capture a first image of the target;
   a second image sensor is configured to capture a second image of the target;
   a controller configured to:
      execute a digital magnification on the first image captured by the first image sensor and on the second image captured by the second image sensor,
      crop the first image and the second image to overlap a first portion of the target captured by the first image sensor with a second portion of the target captured by the second image sensor, wherein the first portion of the target overlaps with the second portion of the target, adjust the cropping of the first image and the second image to provide binocular overlap of the first portion of the target with the second portion of the target, wherein the binocular overlap of the first image and the second image is an overlap threshold that when satisfied results in a 3D image of the target displayed to a user after the digital magnification is executed, and instruct a display to display the cropped first image and the cropped second image that includes the binocular overlap to the user, wherein the displayed cropped first image and the cropped second image display the 3D image at the digital magnification to the user.

2. The system of claim 1, wherein the controller is further configured to:

resize the cropped first image to the original size of the first image captured by the first image sensor and the cropped second image to the original size of the second image captured by the second image sensor, wherein the cropped first image as resized and the cropped second image as resized includes the binocular overlap of the first image and the second image; and instruct the display to display the resized and cropped first image and the resized and cropped second image that includes the binocular overlap to the user, wherein the displayed resized and cropped first image and the resized and cropped second image display the 3D image at the digital magnification to the user.

3. The system of claim 2, wherein the controller is further configured to:

crop the first image captured by the first image sensor and the second image captured by the second image sensor to vertically align the overlap of the first portion of the target with the second portion of the target, wherein the cropped first image is in vertical alignment of the cropped second image when a first plurality of vertical coordinates of the cropped first image is aligned with each corresponding vertical coordinate from a second plurality of coordinates of the cropped second image;

adjust the cropping of the first image and the second image to provide binocular overlap of the first portion of the target with the second portion of the target, wherein the binocular overlap of the first image and the second image is vertically aligned to satisfy the overlap threshold to generate the 3D image of the target displayed to the user after the digital magnification is executed.

4. The system of claim 3, wherein the controller is further configured to:

after executing a first digital magnification at a first digital magnification level on the first image captured by the first image sensor and on the second image captured by the second image sensor, maintain the binocular overlap generated by adjusting the cropping of the first image and the second image to satisfy the overlap threshold;

execute a second digital magnification at a second digital magnification level on the first image captured by the first image sensor and on the second image captured by the second image sensor, wherein the second digital magnification level is increased from the first digital magnification level; and maintain the binocular overlap generated after executing the first digital magnification at the first digital magnification level on the first image and the second image to when executing the second digital magnification at the second digital magnification level.

5. The system of claim 4, wherein the controller is further configured to:

after executing each previous digital magnification at each previous digital magnification level on the first image and the second image, maintain the binocular overlap and the vertical alignment determined when executing the first digital magnification at the first digital magnification level on the first image and the second image; and continue to maintain the binocular overlap and the vertical alignment determined from the adjusting of the cropping of the first image and the second image to satisfy the overlap threshold after executing the first digital magnification at the first digital magnification level on the first image and the second image for each subsequent digital magnification at each subsequent digital magnification level, wherein each subsequent digital magnification level is increased from each previous digital magnification level.

6. The system of claim 4, wherein the controller is further configured to:

execute the first digital magnification at the first digital magnification level on a non-concentric portion of the first image and a non-concentric portion of the second image, wherein the non-concentric portion of the first image and the second image is a portion of the first image and the second image that differs from a center of the first image and the second image;

adjust the cropping of the first image and the second image to provide binocular overlap of the non-concentric portion of the first image and the non-concentric portion of the second image, wherein the binocular overlap of the non-concentric portion of the first image and the non-concentric portion of the second image satisfies the overlap threshold; and continue to crop a non-concentric portion of the first image and a non-concentric portion of the second image for each subsequent digital magnification at each subsequent digital magnification level, wherein the binocular overlap of the non-concentric portion of the first image and the non-concentric portion of the second image is maintained from the first digital magnification at the first digital magnification level.

7. The system of claim 4, wherein the controller is further configured to:

determine a distance that the first image sensor and the second image sensor is positioned from the target;

execute the cropping of the first image and the second image to maintain the vertical alignment and the binocular overlap for each digital magnification at each digital magnification level based on the distance of the first image sensor and the second image sensor from the target.

8. The system of claim 4, further comprising at least one wearable display that displays the resized and cropped first image and the resized and cropped second image to display the 3D image of the target after the digital magnification is executed that includes the binocular overlap of the first image and the second image that are vertically aligned to satisfy the overlap threshold.

9. The system of claim 4, further comprising a display that is configured to: display the resized and cropped first image and the resized and cropped second image to thereby display the 3D image of the target after the digital magnification is executed that includes the binocular overlap of the first image and the second image that are vertically aligned to satisfy the overlap threshold.

10. The system of claim 5, wherein the overlap threshold is satisfied when the binocular overlap includes 75% overlap of the first image and the second image and is maintained for each subsequent digital magnification at each subsequent digital magnification level.

11. A method for generating a three-dimensional (3D) images from captured images of a target when executing digital magnification on the captured images to maintain the 3D images generated of the target after digital magnification, comprising:
capturing a first image by a first image sensor of the target;
capturing a second image by a second image sensor of the target;
executing by a controller a digital magnification on the first image captured by the first image sensor of the target and the second image captured by the second image sensor of the target;
cropping the first image and the second image to overlap a first portion of the target captured by the first image sensor with a second portion of the target captured by the second image sensor, wherein the first portion of the target overlaps partially or fully with the second portion of the target;
adjusting the cropping of the first image and the second image to provide binocular overlap of the first portion of the target with the second portion of the target, wherein the binocular overlap of the first image and the second image is an overlap threshold that when satisfied results in a 3D image of the target displayed to a user after the digital magnification is executed; and
instructing a display to display the cropped first image and the cropped second image that includes the binocular overlap to the user, wherein the displayed cropped first image and the cropped second image display the 3D image at the digital magnification to the user.

12. The method of claim 11, further comprising:
resizing the cropped first image to the original size of the first image captured by the first image sensor and the cropped second image to the original size of the second image captured by the second image sensor, wherein the cropped first image as resized and the cropped second image as resized includes the binocular overlap of the first image and the second image; and
instructing the display to display the resized and cropped first image and the resized and cropped second image that includes the binocular overlap to the user, wherein the displayed resized and cropped first image and the resized and cropped second image display the 3D image at the digital magnification to the user.

13. The system of claim 12, further comprising:
cropping the first image captured by the first image sensor and the second image captured by the second image sensor to vertically align the overlap of the first portion of the target with the second portion of the target, wherein the cropped first image is in vertical alignment of the cropped second image when each vertical coordinate of the cropped first image is aligned with each corresponding vertical coordinate of the cropped second image; and
adjusting the cropping of the first image and the second image to provide binocular overlap of the first portion of the target with the second portion of the target, wherein the binocular overlap of the first image and the second image is vertically aligned to satisfy the overlap threshold to generate the 3D image of the target displayed to the user after the digital magnification is executed.

14. The method of claim 13, further comprising:
after executing a first digital magnification at a first digital magnification level on the first image captured by the first image sensor and on the second image captured by the second image sensor, locking in the binocular overlap generated by adjusting the cropping of the first image and the second image to satisfy the overlap threshold;
executing a second digital magnification at a second digital magnification level on the first image captured by the first image sensor and on the second image captured by the second image sensor, wherein the second digital magnification level is increased from the first digital magnification level; and
maintaining the binocular overlap generated after executing the first digital magnification at the first digital magnification level on the first image and the second image when executing the second digital magnification at the second digital magnification level.

15. The method of claim 14, further comprising:
after executing each previous digital magnification at each previous digital magnification level on the first image and the second image, maintaining the binocular overlap and the vertical alignment determined when executing the first digital magnification at the first digital magnification level on the first image and the second image; and
continuing to maintain the binocular overlap and the vertical alignment determined from the adjusting of the cropping of the first image and the second image to satisfy the overlap threshold after executing the first digital magnification at the first digital magnification level on the first image and the second image for each subsequent digital magnification at each subsequent digital magnification level, wherein each subsequent digital magnification level is increased from each previous digital magnification level.

16. The method of claim 14, further comprising:
executing the first digital magnification at the first digital magnification level on a non-concentric portion of the first image and on a non-concentric portion of the second image, wherein the non-concentric portion of the first image and the second image is a portion of the first image and the second image that differs from a center of the first image and the second image;
adjusting the cropping of the first image and the second image to provide binocular overlap of the non-concentric portion of the first image and the non-concentric portion of the second image, wherein the binocular overlap of the non-concentric portion of the first image and the non-concentric portion of the second image satisfies the overlap threshold; and
continuing to capture a non-concentric portion of the first image and a non-concentric portion of the second image for each subsequent digital magnification at each subsequent digital magnification level, wherein the binocular overlap of the non-concentric portion of the first image and the non-concentric portion of the second image is maintained from the first digital magnification at the first digital magnification level.

17. The method of claim 14, further comprising:
determining a distance that the first image sensor and the second image sensor is positioned from the target; and
executing the cropping of the first image and the second image to maintain the vertical alignment and the binocular overlap for digital magnification at a digital magnification level based on the distance of the first image sensor and the second image sensor from the target.

18. The method of claim 14, further comprising:
displaying by a wearable display the resized and cropped first image and the resized and cropped second image to display the 3D image of the target after the digital magnification is executed that includes the binocular overlap of the first image and the second image that are vertically aligned to satisfy the overlap threshold.

19. The method of claim 18, further comprising:
positioning the first image sensor and the second image sensor on the wearable display for the user to execute a surgical procedure on a target that is a patient.

20. The method of claim 15, further comprising:
satisfying the overlap threshold when the binocular overlap includes overlap of the first image and the second image and is maintained for each subsequent digital magnification at each subsequent digital magnification level.

* * * * *